US012612782B2

(12) United States Patent
Bartnik Johansson et al.

(10) Patent No.: US 12,612,782 B2
(45) Date of Patent: Apr. 28, 2026

(54) MINERAL FIBER PRODUCT

(71) Applicant: ROCKWOOL A/S, Hedehusene (DK)

(72) Inventors: Dorte Bartnik Johansson, Roskilde (DK); Miroslav Nikolic, Aarhus (DK)

(73) Assignee: ROCKWOOL A/S, Hedehusene (DK)

( * ) Notice: Subject to any disclaimer, the term of this patent is extended or adjusted under 35 U.S.C. 154(b) by 347 days.

(21) Appl. No.: 18/270,363

(22) PCT Filed: Oct. 1, 2021

(86) PCT No.: PCT/EP2021/077188
§ 371 (c)(1),
(2) Date: Jun. 29, 2023

(87) PCT Pub. No.: WO2022/144109
PCT Pub. Date: Jul. 7, 2022

(65) Prior Publication Data

US 2024/0125022 A1 Apr. 18, 2024

(30) Foreign Application Priority Data

Dec. 30, 2020 (WO) ................ PCT/EP2020/088061

(51) Int. Cl.
*E04B 1/86* (2006.01)
*B01J 20/24* (2006.01)
(Continued)

(52) U.S. Cl.
CPC ................ *E04B 1/86* (2013.01); *B01J 20/24* (2013.01); *B01J 20/28004* (2013.01);
(Continued)

(58) Field of Classification Search
CPC ................ E04B 1/86; E04B 2001/742; E04B 2001/8461; E04B 1/88; B01J 20/24; B01J 20/28004; B01J 20/28023; B01J 20/2803; B01J 20/3042; B01J 2220/4837; B32B 3/18; B32B 5/02; B32B 5/10; B32B 5/26; B32B 17/02; B32B 37/1207; B32B 2037/1253; B32B 2250/02; B32B 2260/023; B32B 2260/046; B32B 2262/101; B32B 2262/16; B32B 2307/304; B32B 2307/72; B32B 2307/7265; B32B 2307/7376; B32B 2419/06; C04B 14/46; C04B 20/0048; C04B 24/32; C04B 26/02; C04B 2103/30; C04B 2111/52; C04B 2201/30; C08J 5/0405; C08K 13/02;
(Continued)

(56) References Cited

U.S. PATENT DOCUMENTS 3,923,532 A 12/1975 Morman
5,318,990 A 6/1994 Strauss
(Continued)

FOREIGN PATENT DOCUMENTS

EP 0583086 A1 2/1994
EP 0990727 A1 4/2000
(Continued)

*Primary Examiner* — Matthew D Matzek
(74) *Attorney, Agent, or Firm* — Abel Schillinger, LLP

(57) ABSTRACT

The invention is directed to a mineral fibre product, comprising mineral fibres in contact with a binder resulting from the curing of an aqueous binder composition free of phenol and formaldehyde.

18 Claims, 1 Drawing Sheet

(51) Int. Cl.

| | |
|---|---|
| ***B01J 20/28*** | (2006.01) |
| ***B01J 20/30*** | (2006.01) |
| ***B32B 3/18*** | (2006.01) |
| ***B32B 5/02*** | (2006.01) |
| ***B32B 5/10*** | (2006.01) |
| ***B32B 5/26*** | (2006.01) |
| ***B32B 17/02*** | (2006.01) |
| ***B32B 37/12*** | (2006.01) |
| ***C04B 14/46*** | (2006.01) |
| ***C04B 20/00*** | (2006.01) |
| ***C04B 24/32*** | (2006.01) |
| ***C04B 26/02*** | (2006.01) |
| ***C08J 5/04*** | (2006.01) |
| ***C08K 13/02*** | (2006.01) |
| ***C08L 97/00*** | (2006.01) |
| ***D04H 1/4209*** | (2012.01) |
| ***D04H 1/4218*** | (2012.01) |
| ***D04H 1/587*** | (2012.01) |
| ***D04H 1/60*** | (2006.01) |
| ***D04H 1/72*** | (2012.01) |
| ***E01C 13/08*** | (2006.01) |
| ***E04B 1/88*** | (2006.01) |
| ***E04D 11/02*** | (2006.01) |
| ***E04D 13/04*** | (2006.01) |
| *C04B 103/30* | (2006.01) |
| *C04B 111/52* | (2006.01) |
| *C08K 3/22* | (2006.01) |
| *C08K 5/053* | (2006.01) |
| *C08K 5/07* | (2006.01) |
| *C08K 5/1515* | (2006.01) |
| *C08K 5/1545* | (2006.01) |
| *C08K 5/17* | (2006.01) |
| *C08K 5/20* | (2006.01) |
| *C08K 5/21* | (2006.01) |
| *E04B 1/74* | (2006.01) |
| *E04B 1/84* | (2006.01) |
| *E04D 11/00* | (2006.01) |

(52) U.S. Cl.

CPC ..... *B01J 20/28023* (2013.01); *B01J 20/2803* (2013.01); *B01J 20/3042* (2013.01); *B32B 3/18* (2013.01); *B32B 5/02* (2013.01); *B32B 5/10* (2013.01); *B32B 5/26* (2013.01); *B32B 17/02* (2013.01); *B32B 37/1207* (2013.01); *C04B 14/46* (2013.01); *C04B 20/0048* (2013.01); *C04B 24/32* (2013.01); *C04B 26/02* (2013.01); *C08J 5/0405* (2021.05); *C08K 13/02* (2013.01); *C08L 97/005* (2013.01); *D04H 1/4209* (2013.01); *D04H 1/4218* (2013.01); *D04H 1/587* (2013.01); *D04H 1/60* (2013.01); *D04H 1/72* (2013.01); *E01C 13/08* (2013.01); *E04B 1/88* (2013.01); *E04D 11/02* (2013.01); *E04D 13/0404* (2013.01); *B01J 2220/4837* (2013.01); *B32B 2037/1253* (2013.01); *B32B 2250/02* (2013.01); *B32B 2260/023* (2013.01); *B32B 2260/046* (2013.01); *B32B 2262/101* (2013.01); *B32B 2262/16* (2021.05); *B32B 2307/304* (2013.01); *B32B 2307/72* (2013.01); *B32B 2307/7265* (2013.01); *B32B 2307/7376* (2023.05); *B32B 2419/06* (2013.01); *C04B 2103/30* (2013.01); *C04B 2111/52* (2013.01); *C04B 2201/30* (2013.01); *C08K 3/22* (2013.01); *C08K 5/053* (2013.01); *C08K 5/07* (2013.01); *C08K 5/1515* (2013.01); *C08K 5/1545* (2013.01); *C08K 5/17* (2013.01); *C08K 5/20* (2013.01); *C08K 5/21* (2013.01); *C08K 2201/014* (2013.01); *C08L 2205/06* (2013.01); *C08L 2312/00* (2013.01); *D10B 2401/063* (2013.01); *D10B 2505/18* (2013.01); *E01C 2201/10* (2013.01); *E01C 2201/16* (2013.01); *E01C 2201/20* (2013.01); *E04B 2001/742* (2013.01); *E04B 2001/8461* (2013.01); *E04D 11/002* (2013.01)

(58) Field of Classification Search

CPC . C08K 3/22; C08K 5/053; C08K 5/07; C08K 5/1515; C08K 5/1545; C08K 5/17; C08K 5/20; C08K 5/21; C08K 2201/014; C08L 97/005; C08L 2205/06; C08L 2312/00; D04H 1/4209; D04H 1/4218; D04H 1/587; D04H 1/60; D04H 1/72; E04D 11/02; E04D 13/0404; E04D 11/002; D10B 2401/063; D10B 2505/18; Y02A 30/254; Y02B 80/32

USPC .......................................................... 442/327

See application file for complete search history.

(56) References Cited

U.S. PATENT DOCUMENTS

| | | | |
|---|---|---|---|
| 10,435,329 | B2 | 10/2019 | Allais et al. |
| 2002/0061959 | A1 | 5/2002 | Kajimaru et al. |
| 2007/0173588 | A1 | 7/2007 | Espiard et al. |
| 2018/0002225 | A1 | 1/2018 | Allais et al. |
| 2018/0009708 | A1 | 1/2018 | Allais et al. |
| 2018/0201542 | A1 | 7/2018 | Hansen |
| 2022/0106508 | A1 | 4/2022 | Johannson et al. |
| 2024/0110062 | A1 | 4/2024 | Bartnik Johansson et al. |

FOREIGN PATENT DOCUMENTS

| | | | | |
|---|---|---|---|---|
| EP | 1741726 | A1 | 1/2007 | |
| EP | 3632866 | A1 * | 4/2020 | ............. C03C 25/26 |
| WO | 9936368 | A1 | 7/1999 | |
| WO | 0105725 | A1 | 1/2001 | |
| WO | 0196460 | A2 | 12/2001 | |
| WO | 0206178 | A1 | 1/2002 | |
| WO | 2004007615 | A1 | 1/2004 | |
| WO | 2006061249 | A1 | 6/2006 | |
| WO | 2008023032 | A1 | 2/2008 | |
| WO | 2012172262 | A1 | 12/2012 | |

* cited by examiner

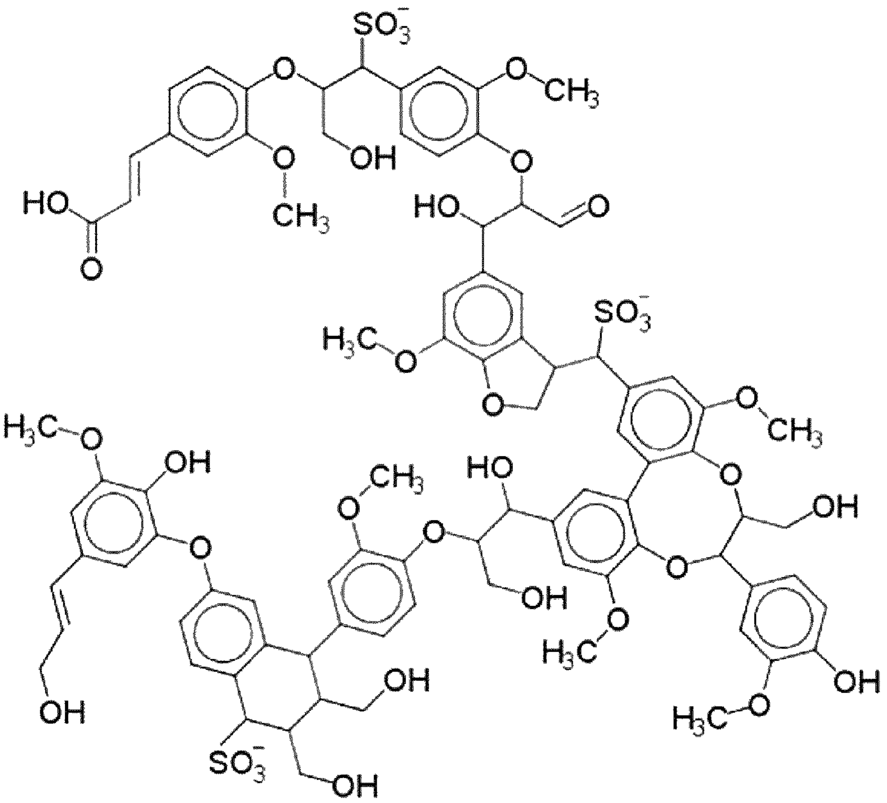
SO3-
O
OCH3
O
OH
HO
O
CH3
HO
O
O
H3C
O
SO3-
O
O
CH3
H3C
O
OH
O
CH3
HO
O
OH
O
O
OH
OH
O
H3C
O
OH
OH
SO3-
OH
OH
H3C
O

MINERAL FIBER PRODUCT

FIELD OF THE INVENTION

Background of the Invention

Mineral fibre products generally comprise man-made vitreous fibres (MMVF) such as, e.g., glass fibres, ceramic fibres, basalt fibres, slag wool, mineral wool and stone wool, which are bonded together by a cured thermoset polymeric binder material. For use as thermal or acoustical insulation products, bonded mineral fibre mats are generally produced by converting a melt made of suitable raw materials to fibres in conventional manner, for instance by a spinning cup process or by a cascade rotor process. The fibres are blown into a forming chamber and, while airborne and while still hot, are sprayed with a binder solution and randomly deposited as a mat or web onto a travelling conveyor. The fibre mat is then transferred to a curing oven where heated air is blown through the mat to cure the binder and rigidly bond the mineral fibres together.

In the past, the binder resins of choice have been phenol-formaldehyde resins which can be economically produced and can be extended with urea prior to use as a binder. However, the existing and proposed legislation directed to the lowering or elimination of formaldehyde emissions have led to the development of formaldehyde-free binders such as, for instance, the binder compositions based on polycarboxy polymers and polyols or polyamines, such as disclosed in EP-A-583086, EP-A-990727, EP-A-1741726, U.S. Pat. No. 5,318,990 and US-A-2007/0173588.

Another group of non-phenol-formaldehyde binders are the addition/-elimination reaction products of aliphatic and/or aromatic anhydrides with alkanolamines, e.g., as disclosed in WO 99/36368, WO 01/05725, WO 01/96460, WO 02/06178, WO 2004/007615 and WO 2006/061249. These binder compositions are water soluble and exhibit excellent binding properties in terms of curing speed and curing density. WO 2008/023032 discloses urea-modified binders of that type which provide mineral wool products having reduced moisture take-up.

Since some of the starting materials used in the production of these binders are rather expensive chemicals, there is an ongoing need to provide formaldehyde-free binders which are economically produced.

A further effect in connection with previously known aqueous binder compositions from mineral fibres is that at least the majority of the starting materials used for the productions of these binders stem from fossil fuels. There is an ongoing trend of consumers to prefer products that are fully or at least partly produced from renewable materials and there is therefore a need to provide binders for mineral wool which are, at least partly, produced from renewable materials.

A further effect in connection with previously known aqueous binder compositions for mineral fibres is that they involve components which are corrosive and/or harmful. This requires protective measures for the machinery involved in the production of mineral wool products to prevent corrosion and also requires safety measures for the persons handling this machinery. This leads to increased costs and health issues and there is therefore a need to provide binder compositions for mineral fibres with a reduced content of corrosive and/or harmful materials.

A further effect in connection with previously-known binder compositions for mineral fibres is that the curing of the binder composition during the manufacturing process of a mineral wool product bound by the binders can involve the emission of unwanted substances which requires emission control and contributes to the increase of the complexity of machinery and the costs involved for the production.

In recent times, a number of binders for mineral fibres have been provided, which are to a large extend based on renewable starting materials. In many cases these binder based to a large extent on renewable resources are also formaldehyde-free.

However, many of these binders are still comparatively expensive because they are based on comparatively expensive basic materials.

In the meantime, binders for mineral fibres have been provided, which are based on lignin components which have been oxidised in order to make them suitable as components of a binder composition for mineral wool. While very good binding properties are achieved by these mineral wool binders based on pre-oxidised lignins, the preparation of such binders still requires the extra step of oxidising the lignin components before they can be used as components for the binder compositions. This pre-oxidation step necessary for utilising the lignin components complicates the production process for such binders to a certain extent by increasing the reaction time, reducing the output and increases the costs for such binders due to extra cost for raw materials, process equipment and manning.

SUMMARY OF THE INVENTION

Accordingly, it was an object of the present invention to provide a mineral wool product comprising mineral fibres in contact with a binder resulting from the curing of a binder composition suitable for bonding mineral fibres, which uses renewable materials as starting materials, reduces or eliminates corrosive and/or harmful materials, and is inexpensive to produce.

It was a further object of the present invention to provide a mineral wool product comprising mineral fibres in contact with a binder resulting from the curing of a binder composition suitable for bonding mineral fibres, which allows an increased solid content (and thereby lowered transport costs and less impact on the environment), a reduced viscosity (which makes it easier to process in large scale), and a long shelf life.

Further the present invention provides the use of a lignin component for the preparation of a binder composition for mineral wool.

In accordance with a first aspect of the present invention, there is provided a mineral fibre product, comprising mineral fibres in contact with a binder resulting from the curing of an aqueous binder composition free of phenol and formaldehyde comprising:

- a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins,
- a component (ii) in form of one or more cross-linkers.

In particular, in accordance with a first aspect of the present invention, there is provided a mineral fibre product, comprising mineral fibres in contact with a binder resulting from the curing of an aqueous binder composition, preferably free of phenol and formaldehyde comprising:

- a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers, with the proviso that the aqueous binder composition does not comprise a cross-linker selected from epoxy compounds having a molecular weight Mw of 500 or less carbonyl compounds selected from aldehydes, carbonyl compounds of the formula $R—[C(O)R_1]_x$ in which:

R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10, polyamines mono- and oligosaccharides.

The present inventors have surprisingly found that it is possible to provide a mineral wool product comprising mineral fibres bound by a binder resulting from the curing of a binder composition, whereby the binder composition can be produced from inexpensive renewable materials, in form of a lignin component, which does not require an oxidation step previous to the use in the binder composition and, to a large degree, does not contain, or contains only to a minor degree, any corrosive and/or harmful agents.

The present inventors have surprisingly found that it is possible to provide a mineral wool product comprising mineral fibres bound by a binder resulting from the curing of a binder composition, whereby the binder composition in its most simple form requires only two main components in form of a lignin component and a cross-linker or three main components in form of a lignin component, a cross-linker and a plasticizer. This reduced complexity in the composition of the binder and compared with previously-known multicomponent system reduces the complexity of the supply chain, facilitates the handling of storage capacities and improves the storability of the binders. All these factors contribute to economic advantages of the binder composition according to the present invention.

DESCRIPTION OF THE PREFERRED EMBODIMENTS

In one embodiment, the mineral wool product according to the present invention comprises mineral fibres in contact with a binder resulting from the curing of an aqueous binder composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers.

In particular, in accordance with a first aspect of the present invention, there is provided a mineral fibre product, comprising mineral fibres in contact with a binder resulting from the curing of an aqueous binder composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers, with the proviso that the aqueous binder composition does not comprise a cross-linker selected from epoxy compounds having a molecular weight Mw of 500 or less.

In particular, in accordance with a first aspect of the present invention, there is provided mineral fibre product, comprising mineral fibres in contact with a binder resulting from the curing of an aqueous binder composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers, with the proviso that the aqueous binder composition does not comprise a cross-linker selected from carbonyl compounds selected from aldehydes, carbonyl compounds of the formula $R—[C(O)R_1]_x$ in which:

R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10.

In particular, in accordance with a first aspect of the present invention, there is provided mineral fibre product, comprising mineral fibres in contact with a binder resulting from the curing of an aqueous binder composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers, with the proviso that the aqueous binder composition does not comprise a cross-linker selected from polyamines.

In particular, in accordance with a first aspect of the present invention, there is provided mineral fibre product, comprising mineral fibres in contact with a binder resulting from the curing of an aqueous binder composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers, with the proviso that the aqueous binder composition does not comprise a cross-linker selected from mono- and oligosaccharides.

In one embodiment, the mineral wool product according to the present invention comprises mineral fibres in contact with a binder resulting from the curing of an aqueous binder composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers selected from β-hydroxyalkylamide-cross-linkers, such as N-(2-hydroxyisopropyl)amide-cross-linkers, such as N-(2-hydroxyethyl)amide-cross-linkers, such as N-(2-hydroxyethyl)adipamide-cross-linkers, such as N,N,N',N'-tetrakis(2-hydroxyethyl)adipamide and/or the group consisting of multifunctional organic amines such as an alkanolamine, diamines, such as hexamethyldiamine, and/or epoxy compounds having a molecular weight of more than 500, such as an epoxidised oil based on fatty acid triglyceride or one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups, and/or one or more cross-linkers in form of multifunctional carbodiimides, such as aliphatic multifunctional carbodiimides, and/or Primid XL-552, with the proviso that the aqueous binder composition does not comprise a cross-linker selected from epoxy compounds having a molecular weight Mw of 500 or less carbonyl compounds selected from aldehydes, carbonyl compounds of the formula $R—[C(O)R_1]_x$ in which:

R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10, polyamines.

Optionally, the aqueous binder composition additionally comprises a component (iii) in form of one or more plasticizers.

In one embodiment, the mineral wool product according to the present invention comprises mineral fibres in contact with a binder resulting from the curing of an aqueous binder composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers;

a component (iii) in form of one or more plasticizers.

In particular, in accordance with a first aspect of the present invention, there is provided a mineral fibre product, comprising mineral fibres in contact with a binder resulting from the curing of an aqueous binder composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers;

a component (iii) in form of one or more plasticizers, with the proviso that the aqueous binder composition does not comprise a cross-linker selected from epoxy compounds having a molecular weight Mw of 500 or less.

In particular, in accordance with a first aspect of the present invention, there is provided mineral fibre product, comprising mineral fibres in contact with a binder resulting from the curing of an aqueous binder composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers;

a component (iii) in form of one or more plasticizers, with the proviso that the aqueous binder composition does not comprise a cross-linker selected from carbonyl compounds selected from aldehydes, carbonyl compounds of the formula $R—[C(O)R_1]_x$ in which:

R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10.

In particular, in accordance with a first aspect of the present invention, there is provided mineral fibre product, comprising mineral fibres in contact with a binder resulting from the curing of an aqueous binder composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers;

a component (iii) in form of one or more plasticizers, with the proviso that the aqueous binder composition does not comprise a cross-linker selected from polyamines.

In particular, in accordance with a first aspect of the present invention, there is provided mineral fibre product, comprising mineral fibres in contact with a binder resulting from the curing of an aqueous binder composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers;

a component (iii) in form of one or more plasticizers, with the proviso that the aqueous binder composition does not comprise a cross-linker selected from mono- and oligosaccharides.

In one embodiment, the mineral wool product according to the present invention comprises mineral fibres in contact with a binder resulting from the curing of an aqueous binder composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers selected from β-hydroxyalkylamide-cross-linkers, and/or epoxy compounds having a molecular weight of more than 500, such as an epoxidised oil based on fatty acid triglyceride or one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups, and/or one or more cross-linkers in form of multifunctional carbodiimides, such as aliphatic multifunctional carbodiimides; and/or Primid XL-552;

a component (iii) in form of one or more plasticizers, with the proviso that the aqueous binder composition does not comprise a cross-linker selected from epoxy compounds having a molecular weight Mw of 500 or less carbonyl compounds selected from aldehydes, carbonyl compounds of the formula $R—[C(O)R_1]_x$ in which:

R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10, polyamines.

In a preferred embodiment, the binders are formaldehyde free.

For the purpose of the present application, the term "formaldehyde free" is defined to characterize a mineral wool product where the emission is below 5 μg/m$^2$/h of formaldehyde from the mineral wool product, preferably below 3 μg/m$^2$/h. Preferably, the test is carried out in accordance with ISO 16000 for testing aldehyde emissions.

In a preferred embodiment, the binders are phenol free.

For the purpose of the present application, the term "phenol free" is defined in such a way that the aqueous binder composition does contain phenol

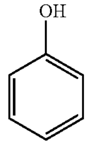

in an amount of 0.25 wt.-%, such as 0.1 wt.-%, such as 0.05 wt.-%, based on the total weight of an aqueous composition having a dry solids binder content of 15 wt. %.

In one embodiment, the binder composition does not contain added formaldehyde.

In one embodiment, the binder composition does not contain added phenol.

For the purpose of the present invention, the term "mono- and oligosaccharides" is defined to comprise monosaccharides and oligosaccharides having 10 or less saccharide units.

For the purpose of the present invention, the term "sugar" is defined to comprise monosaccharides and oligosaccharides having 10 or less saccharide units.

Component (i)

Component (i) is in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins.

Lignin, cellulose and hemicellulose are the three main organic compounds in a plant cell wall. Lignin can be thought of as the glue, that holds the cellulose fibres together. Lignin contains both hydrophilic and hydrophobic groups. It is the second most abundant natural polymer in the world, second only to cellulose, and is estimated to represent as much as 20-30% of the total carbon contained in the biomass, which is more than 1 billion tons globally.

The lignosulfonate process introduces large amount of sulfonate groups making the lignin soluble in water but also in acidic water solutions. Lignosulfonates has up to 8% sulfur as sulfonate, whereas kraft lignin has 1-2% sulfur, mostly bonded to the lignin. The molecular weight of lignosulfonate is 15.000-50.000 g/mol. The typical hydrophobic core of lignin together with large number of ionized sulfonate groups make this lignin attractive as a surfactant and it often finds application in dispersing cement etc.

To produce lignin-based value-added products, lignin should be first separated from biomass, for which several methods can be employed. Kraft and sulfite pulping processes are known for their effective lignin separation from wood, and hence, are used worldwide. Kraft lignin is separated from wood with the help of NaOH and Na2S. Lignins from sulfite pulping processes are denoted as lignosulfonates, and are produced by using sulfurous acid and/or a sulfite salt containing magnesium, calcium, sodium, or ammonium at varying pH levels. Currently, lignosulfonates account for 90% of the total market of commercial lignin, and the total annual worldwide production of lignosulfonates is approximately 1.8 million tons. Lignosulfonates have generally abundance of sulfonic groups, and thus, a higher amount of sulfur than kraft lignin. Due to the presence of the sulfonated group, lignosulfonates are anionically charged and water soluble. The molecular weights (Mw) of lignosulfonates can be similar to or larger than that of kraft lignin. Due to their unique properties, lignosulfonates have a wide range of uses, such as animal feed, pesticides, surfactants, additives in oil drilling, stabilizers in colloidal suspensions, and as plasticizers in concrete admixtures. However, the majority of new pulp mills employ kraft technology for pulp production, and thus, kraft lignin is more readily available for value-added production.

However, lignosulfonates and kraft lignin have different properties coming from different isolation processes and thus distribution of functional groups. High level of sulfonic groups in lignosulfonates, generally at least one for every four C9 units, makes lignosulfonates strongly charged at all pH levels in water. This abundance of ionisable functional groups can explain most of the differences compared to other technical lignins. Higher charge density allows easier water solubility and higher solid content in solution possible compared to kraft lignin. Also, for the same reason, lignosulfonates will have lower solution viscosity compared to kraft lignin at the same solid content which can facilitate handling and processing. Commonly used model structure of lignosulfonates is shown on FIG. 1.

In one embodiment, component (i) is having a carboxylic acid group content of 0.05 to 0.6 mmol/g, such as 0.1 to 0.4 mmol/g, based on the dry weight of lignosulfonate lignins.

In one embodiment, component (i) is in form of one or more lignosulfonate lignins having an average carboxylic acid group content of less than 1.8 groups per macromolecule considering the M_n wt. average of component (i), such as less than 1.4 such as less than 1.1 such as less than 0.7 such as less than 0.4.

In one embodiment, component (i) is having a content of phenolic OH groups of 0.3 to 2.5 mmol/g, such as 0.5 to 2.0 mmol/g, such as 0.5 to 1.5 mmol/g. based on the dry weight of lignosulfonate lignins.

In one embodiment, component (i) is having a content of aliphatic OH groups of 1.0 to 8.0 mmol/g, such as 1.5 to 6.0 mmol/g, such as 2.0 to 5.0 mmol/g, based on the dry weight of lignosulfonate lignins.

In one embodiment, component (i) comprises ammoniumlignosulfonates and/or calciumlignosulfonates, and/or magnesiumlignosulfonates, and any combinations thereof.

In one embodiment, component (i) comprises ammoniumlignosulfonates and calciumlignosulfonates, wherein the molar ratio of $NH_4^+$ to $Ca^{2+}$ is in the range of 5:1 to 1:5, in particular 3:1 to 1:3.

For the purpose of the present invention, the term lignosulfonates encompasses sulfonated kraft lignins.

In one embodiment, component (i) is a sulfonated kraft lignins.

In one embodiment, the aqueous binder composition contains added sugar in an amount of 0 to 5 wt.-%, such as less than 5 wt.-%, such as 0 to 4.9 wt.-%, such as 0.1 to 4.9 wt.-%, based on the weight of lignosulfonate and sugar.

In one embodiment, the aqueous binder composition comprises component (i), i.e. the lignosulfonate, in an amount of 50 to 98 wt.-%, such as 65 to 98 wt.-%, such as 50 to 88 wt.-%, such as 50 to 87 wt.-%, such as 65 to 88 wt.-%, such as 65 to 87 wt.-%, such as 80 to 88 wt.-%, such as 80 to 87 wt.-%, such as 80 to 98 wt.-%, based on the total weight of components (i) and (ii).

In one embodiment, the aqueous binder composition comprises component (i) in an amount of 50 to 98 wt.-%, such as 65 to 98 wt.-%, such as 80 to 98 wt.-%, such as 50 to 88 wt-%, such as 50 to 87 wt.-%, such as 65 to 88 wt.-%, such as 65 to 87 wt.-%, such as 80 to 88 wt.-%, such as 80 to 87 wt.-%, based on the dry weight of components (i), (ii), and (iii).

For the purpose of the present invention, content of lignin functional groups is determined by using $^{31}P$ NMR as characterization method.

Sample preparation for $^{31}P$ NMR is performed by using 2-chloro-4,4,5,5-tetramethyl-1,3,2-dioxaphospholane (TMDP) as phosphitylation reagent and cholesterol as internal standard. Integration is according to the work of Granata and Argyropoulos (J. Agric. Food Chem. 43:1538-1544).

Component (ii)

Component (ii) is in form of one or more cross-linkers.

In one embodiment, the component (ii) comprises in one embodiment one or more cross-linkers selected from β-hydroxyalkylamide-cross-linkers and/or oxazoline-cross-linkers.

β-hydroxyalkylamide-cross-linkers is a curing agent for the acid-functional macromolecules. It provides a hard, durable, corrosion resistant and solvent resistant cross-linked polymer network. It is believed the β-hydroxyalkylamide cross-linkers cure through esterification reaction to form multiple ester linkages.

The hydroxy functionality of the β-hydroxyalkylamide-cross-linkers should be an average of at least 2, preferably greater than 2 and more preferably 2-4 in order to obtain optimum curing response.

Oxazoline group containing cross-linkers are polymers containing one of more oxazoline groups in each molecule and generally, oxazoline containing cross-linkers can easily be obtained by polymerizing an oxazoline derivative. The patent U.S. Pat. No. 6,818,699 B2 provides a disclosure for such a process.

In one embodiment, the component (ii) is one or more epoxy compounds having a molecular weight of more than 500, such as an epoxidised oil based on fatty acid triglyceride or one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups, such as β-hydroxyalkylamide groups.

In one embodiment, component (ii) is one or more cross-linkers selected from the group consisting of fatty amines.

In one embodiment, component (ii) is one or more cross-linkers in form of fatty amides.

In one embodiment, component (ii) is one or more cross-linkers selected from polyester polyols, such as polycaprolactone.

In one embodiment, component (ii) is one or more cross-linkers selected from the group consisting of starch, modified starch, CMC.

In one embodiment, component (ii) is one or more cross-linkers in form of multifunctional carbodiimides, such as aliphatic multifunctional carbodiimides.

In one embodiment, the component (ii) is one or more cross-linkers in form of aziridines, such as CX100, NeoAdd-Pax 521/523.

In one embodiment, component (ii) is one or more cross-linkers selected from melamine based cross-linkers, such as a hexakis(methylmethoxy)melamine (HMMM) based cross-linkers.

Examples of such compounds are Picassian XL 701, 702, 725 (Stahl Polymers), such as ZOLDINE® XL-29SE (Angus Chemical Company), such as CX300 (DSM), such as Carbodilite V-02-L2 (Nisshinbo Chemical Inc.).

In one embodiment, component (ii) is Primid XL552, which has the following structure:

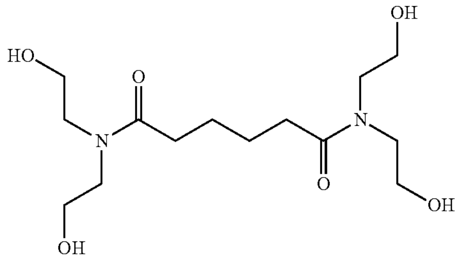

Primid XL-552

Component (ii) can also be any mixture of the above mentioned compounds.

In one embodiment, the binder composition according to the present invention comprises component (ii) in an amount of 1 to 50 wt.-%, such as 4 to 20 wt.-%, such as 6 to 12 wt.-%, based on the dry weight of component (i).

In one embodiment, component (ii) is in form of one or more cross-linkers selected from β-hydroxyalkylamide-cross-linkers, such as N-(2-hydroxyisopropyl)amide-cross-linkers, such as N-(2-hydroxyethyl)amide-cross-linkers, such as N-(2-hydroxyethyl)adipamide-cross-linkers, such as N,N,N',N'-tetrakis(2-hydroxyethyl)adipamide and/or the group consisting of multifunctional organic amines such as an alkanolamine, diamines, such as hexamethyldiamine, and/or epoxy compounds having a molecular weight of more than 500, such as an epoxidised oil based on fatty acid triglyceride or one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups, and/or one or more cross-linkers in form of multifunctional carbodiimides, such as aliphatic multifunctional carbodiimides.

In one embodiment, component (ii) comprises one or more cross-linkers selected from β-hydroxyalkylamide-cross-linkers, such as N-(2-hydroxyisopropyl)amide-cross-linkers, such as N-(2-hydroxyethyl)amide-cross-linkers, such as N-(2-hydroxyethyl)adipamide-cross-linkers, such as N,N,N',N'-tetrakis(2-hydroxyethyl)adipamide.

In one embodiment, the aqueous binder composition comprises component (ii) in an amount of 2 to 90 wt.-%, such as 6 to 60 wt.-%, such as 10 to 40 wt.-%, such as 25 to 40 wt.-%, based on the dry weight of component (i).

Optional Component (iii) of the Binder Composition

Optionally, the binder composition may comprise a component (iii). Component (iii) is in form of one or more plasticizers.

In one embodiment, component (iii) is in form of one or more plasticizers selected from the group consisting of polyols, such as carbohydrates, hydrogenated sugars, such as sorbitol, erythriol, glycerol, monoethylene glycol, polyethylene glycols, polyethylene glycol ethers, polyethers, phthalates and/or acids, such as adipic acid, vanillic acid, lactic acid and/or ferullic acid, acrylic polymers, polyvinyl alcohol, polyurethane dispersions, ethylene carbonate, propylene carbonate, lactones, lactams, lactides, acrylic based polymers with free carboxy groups and/or polyurethane dispersions with free carboxy groups, polyamides, amides such as carbamide/urea, or any mixtures thereof.

In one embodiment, component (iii) is in form of one or more plasticizers selected from the group consisting of carbonates, such as ethylene carbonate, propylene carbonate, lactones, lactams, lactides, compounds with a structure similar to lignin like vanillin, acetosyringone, solvents used as coalescing agents like alcohol ethers, polyvinyl alcohol.

In one embodiment, component (iii) is in form of one or more nonreactive plasticizer selected from the group consisting of polyethylene glycols, polyethylene glycol ethers, polyethers, hydrogenated sugars, phthalates and/or other esters, solvents used as coalescing agents like alcohol ethers, acrylic polymers, polyvinyl alcohol.

In one embodiment, component (iii) is one or more reactive plasticizers selected from the group consisting of carbonates, such as ethylene carbonate, propylene carbonate, lactones, lactams, lactides, di- or tricarboxylic acids, such as adipic acid, or lactic acid, and/or vanillic acid and/or ferullic acid, polyurethane dispersions, acrylic based polymers with free carboxy groups, compounds with a structure similar to lignin like vanillin, acetosyringone.

In one embodiment, component (iii) is in form of one or more plasticizers selected from the group consisting of fatty alcohols, monohydroxy alcohols such as pentanol, stearyl alcohol.

In one embodiment, component (iii) comprises one or more plasticizers selected from the group consisting of polyethylene glycols, polyethylene glycol ethers, and/or one or more plasticizers in form of polyols, such as 1,1,1-Tris (hydroxymethyl)propane, and/or triethanolamine.

Another particular surprising aspect of the present invention is that the use of plasticizers having a boiling point of more than 100° C., in particular 140 to 250° C., strongly improves the mechanical properties of the mineral fibre products according to the present invention although, in view of their boiling point, it is likely that these plasticizers will at least in part evaporate during the curing of the binders in contact with the mineral fibres.

In one embodiment, component (iii) comprises one or more plasticizers having a boiling point of more than 100° C., such as 110 to 380° C., more preferred 120 to 300° C., more preferred 140 to 250° C.

It is believed that the effectiveness of these plasticizers in the binder composition according to the present invention is associated with the effect of increasing the mobility of the lignins during the curing process. It is believed that the increased mobility of the lignins during the curing process facilitates the effective cross-linking.

In one embodiment, component (iii) comprises one or more polyethylene glycols having an average molecular weight of 150 to 50000 g/mol, in particular 150 to 4000 g/mol, more particular 150 to 1000 g/mol, preferably 150 to 500 g/mol, more preferably 200 to 400 g/mol.

In one embodiment, component (iii) comprises one or more polyethylene glycols having an average molecular weight of 4000 to 25000 g/mol, in particular 4000 to 15000 g/mol, more particular 8000 to 12000 g/mol.

In one embodiment component (iii) is capable of forming covalent bonds with component (i) and/or component (ii) during the curing process. Such a component would not evaporate and remain as part of the composition but will be effectively altered to not introduce unwanted side effects e.g. water absorption in the cured product. Non-limiting examples of such a component are caprolactone and acrylic based polymers with free carboxyl groups.

In one embodiment, component (iii) is selected from the group consisting of fatty alcohols, monohydroxy alcohols, such as pentanol, stearyl alcohol.

In one embodiment, component (iii) is selected from one or more plasticizers selected from the group consisting of alkoxylates such as ethoxylates such as butanol ethoxylates, such as butoxytriglycol.

In one embodiment, component (iii) is selected from one or more propylene glycols.

In one embodiment, component (iii) is selected from one or more glycol esters.

In one embodiment, component (iii) is selected from one or more plasticizers selected from the group consisting of adipates, acetates, benzoates, cyclobenzoates, citrates, stearates, sorbates, sebacates, azelates, butyrates, valerates.

In one embodiment, component (iii) is selected from one or more plasticizers selected from the group consisting of phenol derivatives such as alkyl or aryl substituted phenols.

In one embodiment, component (iii) is selected from one or more plasticizers selected from the group consisting of silanols, siloxanes.

In one embodiment, component (iii) is selected from one or more plasticizers selected from the group consisting of sulfates such as alkyl sulfates, sulfonates such as alkyl aryl sulfonates such as alkyl sulfonates, phosphates such as tripolyphosphates; such as tributylphosphates.

In one embodiment, component (iii) is selected from one or more hydroxy acids.

In one embodiment, component (iii) is selected from one or more plasticizers selected from the group consisting of monomeric amides such as acetamides, benzamide, fatty acid amides such as tall oil amides.

In one embodiment, component (iii) is selected from one or more plasticizers selected from the group consisting of quaternary ammonium compounds such as trimethylglycine, distearyldimethylammoniumchloride.

In one embodiment, component (iii) is selected from one or more plasticizers selected from the group consisting of vegetable oils such as castor oil, palm oil, linseed oil, tall oil, soybean oil.

In one embodiment, component (iii) is in form of tall oil.

In one embodiment, component (iii) is selected from one or more plasticizers selected from the group consisting of hydrogenated oils, acetylated oils.

In one embodiment, component (iii) is selected from one or more fatty acid methyl esters.

In one embodiment, component (iii) is selected from one or more plasticizers selected from the group consisting of alkyl polyglucosides, gluconamides, aminoglucoseamides, sucrose esters, sorbitan esters.

In one embodiment, component (iii) is selected from the group consisting of polyethylene glycols, polyethylene glycol ethers.

In one embodiment, component (iii) is selected from the group consisting of triethanolamine.

In one embodiment, component (iii) is in form of propylene glycols, phenol derivatives, silanols, siloxanes, hydroxy acids, vegetable oils, polyethylene glycols, polyethylene glycol ethers, and/or one or more plasticizers in form of polyols, such as 1,1,1-Tris(hydroxymethyl)propane, triethanolamine, or any mixtures thereof.

It has surprisingly been found that the inclusion of plasticizers in the binder compositions according to the present invention strongly improves the mechanical properties of the mineral fibre products according to the present invention.

The term plasticizer refers to a substance that is added to a material in order to make the material softer, more flexible (by decreasing the glass-transition temperature Tg) and easier to process.

Component (iii) can also be any mixture of the above mentioned compounds.

In one embodiment, component (iii) is present in an amount of 0.5 to 60, preferably 2.5 to 25, more preferably 3 to 15 wt.-%, based on the dry weight of component (i).

In one embodiment, component (iii) is present in an amount of 0.5 to 60, preferably 2.5 to 25, more preferably 3 to 15 wt.-%, based on the dry weight of components (i), (ii), and (iii).

Binder Composition not Containing a Plasticizer

In one embodiment, the binder compositions according to the present invention do not contain a plasticizer.

Accordingly, in one embodiment, the present invention is directed to a mineral fibre product as described above, with the proviso that the aqueous binder composition does not comprise a plasticizer.

In one embodiment, the present invention is directed to a mineral fibre product as described above, with the proviso that the aqueous binder composition does not comprise a plasticizer in form of

- one or more plasticizers selected from the group consisting of fatty alcohols, monohydroxy alcohols, such as pentanol, stearyl alcohol; and/or
- one or more plasticizers selected from the group consisting of alkoxylates such as ethoxylates, such as butanol ethoxylates, such as butoxytriglycol; and/or
- one or more plasticizers in form of propylene glycols; and/or
- one or more plasticizers in form of glycol esters; and/or
- one or more plasticizers selected from the group consisting of adipates, acetates, benzoates, cyclobenzoates, citrates, stearates, sorbates, sebacates, azelates, butyrates, valerates; and/or
- one or more plasticizers selected from the group consisting of phenol derivatives, such as alkyl or aryl substituted phenols; and/or
- one or more plasticizers selected from the group consisting of silanols, siloxanes; and/or
- one or more plasticizers selected from the group consisting of sulfates such as alkyl sulfates, sulfonates such as alkyl aryl sulfonates such as alkyl sulfonates, phosphates such as tripolyphosphates; and/or
- one or more plasticizers in form of hydroxy acids; and/or
- one or more plasticizers selected from the group consisting of monomeric amides, such as acetamides, benzamide, fatty acid amides such as tall oil amides; and/or
- one or more plasticizers selected from the group consisting of quaternary ammonium compounds such as trimethylglycine, distearyldimethylammoniumchloride; and/or
- one or more plasticizers selected from the group consisting of vegetable oils such as castor oil, palm oil, linseed oil, soybean oil; and/or
- tall oil, and/or
- one or more plasticizers selected from the group consisting of hydrogenated oils, acetylated oils; and/or
- one or more plasticizers selected from acid methyl esters; and/or
- one or more plasticizers selected from the group consisting of alkyl polyglucosides, gluconamides, aminoglucoseamides, sucrose esters, sorbitan esters; and/or
- one or more plasticizers selected from the group consisting of polyethylene glycols, polyethylene glycol ethers; and/or
- one or more plasticizers in form of polyols, such as glycerol, such as 1,1,1-Tris(hydroxymethyl)propane; and/or
- triethanolamine.

In one embodiment, the present invention is directed to a mineral fibre product as described above, with the proviso that the aqueous binder composition does not comprise a plasticizer in form of propylene glycols, phenol derivatives, silanols, siloxanes, hydroxy acids, vegetable oils, polyethylene glycols, polyethylene glycol ethers, triethanolamine, or any mixtures thereof.

In one embodiment, the present invention is directed to a mineral fibre product as described above, with the proviso that the aqueous binder composition does not comprise a plasticizer in form of one or more plasticizers having a boiling point of 100 to 380° C., more preferred 120 to 300° C., more preferred 140 to 250° C. comprises one or more plasticizers having a boiling point of 100 to 380° C., more preferred 120 to 300° C., more preferred 140 to 250° C.

In one embodiment, the present invention is directed to a mineral fibre product as described above, with the proviso that the aqueous binder composition does not comprise a plasticizer in form of comprises one or more polyethylene glycols having an average molecular weight of 150 to 50000 g/mol, in particular 150 to 4000 g/mol, more particular 150 to 1000 g/mol, preferably 150 to 500 g/mol, more preferably 200 to 400 g/mol.

Mineral Fibre Product Comprising Mineral Fibres in Contact with a Binder Resulting from the Curing of a Binder Composition Comprising Components (i) and (iia)

In one embodiment the present invention is directed to a mineral fibre product comprising mineral fibres in contact with a binder resulting from the curing of a binder composition for mineral fibres comprising:

- a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins.
- a component (iia) in form of one or more modifiers, preferably with the proviso that the aqueous binder composition does not comprise a cross-linker selected from
  - epoxy compounds having a molecular weight Mw of 500 or less, and/or with the proviso that the aqueous binder composition does not comprise a cross-linker selected from
  - carbonyl compounds selected from aldehydes, carbonyl compounds of the formula $R—[C(O)R_1]_x$ in which:
  - R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10,
- and/or with the proviso that the aqueous binder composition does not comprise a cross-linker selected from polyamines,
- and/or with the proviso that the aqueous binder composition does not comprise a cross-linker selected from mono- and oligosaccharides.

The present inventors have found that the excellent binder properties can also be achieved by a two-component system which comprises component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins and a component (iia) in form of one or more modifiers, and optionally any of the other components mentioned above and below.

In one embodiment, component (iia) is a modifier in form of one or more compounds selected from the group consisting of epoxy compounds having a molecular weight of more than 500, such as an epoxidised oil based on fatty acid triglyceride or one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups such as β-hydroxyalkylamide groups.

In one embodiment, component (iia) is one or more modifiers selected from the group consisting of polyethylene imine, polyvinyl amine, fatty amines.

In one embodiment, the component (iia) is one or more modifiers selected from multifunctional carbodiimides, such as aliphatic multifunctional carbodiimides.

Component (iia) can also be any mixture of the above mentioned compounds.

Without wanting to be bound by any particular theory, the present inventors believe that the excellent binder properties achieved by the binder composition for mineral fibres comprising components (i) and (iia), and optional further components, are at least partly due to the effect that the modifiers used as components (iia) at least partly serve the function of a plasticizer and a cross-linker.

In one embodiment, the binder composition comprises component (iia) in an amount of 1 to 40 wt.-%, such as 4 to 20 wt.-%, such as 6 to 12 wt.-%, based on the dry weight of the component (i).

Further Components

In some embodiments, the mineral fibre product according to the present invention comprises mineral fibres in contact with a binder composition resulting from the curing of a binder which comprises further components.

In one embodiment, the binder composition comprises a catalyst selected from inorganic acids, such as sulfuric acid, sulfamic acid, nitric acid, boric acid, hypophosphorous acid, and/or phosphoric acid, and/or any salts thereof such as sodium hypophosphite, and/or ammonium salts, such as ammonium salts of sulfuric acid, sulfamic acid, nitric acid, boric acid, hypophosphorous acid, and/or phosphoric acid, and/or sodium polyphosphate (STTP), and/or sodium metaphosphate (STMP), and/or phosphorous oxychloride. The presence of such a catalyst can improve the curing properties of the binder compositions according to the present invention.

In one embodiment, the binder composition comprises a catalyst selected from Lewis acids, which can accept an electron pair from a donor compound forming a Lewis adduct, such as $ZnCl_2$, $Mg(ClO_4)_2$, $Sn[N(SO_2\text{-n-}C_8F_{17})_2]_4$.

In one embodiment, the binder composition comprises a catalyst selected from metal chlorides, such as KCl, $MgCl_2$, $ZnCl_2$, $FeCl_3$ and $SnCl_2$ or their adducts such as $AlCl_3$ adducts, such as $BF_3$ adducts, such as $BF_3$ ethylamine complex.

In one embodiment, the binder composition comprises a catalyst selected from organometallic compounds, such as titanate-based catalysts and stannum based catalysts.

In one embodiment, the binder composition comprises a catalyst selected from chelating agents, such as transition metals, such as iron ions, chromium ions, manganese ions, copper ions and/or from peroxides such as organic peroxides such as dicumyl peroxide.

In one embodiment, the binder composition according to the present invention comprises a catalyst selected from phosphites such as alkyl phosphites, such as aryl phosphites such as triphenyl phosphite.

In one embodiment, the binder composition according to the present invention comprises a catalyst selected from the group of ternary amines such as tris-2,4,6-dimethylaminomethyl phenol.

In one embodiment, the binder composition further comprises a further component (iv) in form of one or more silanes.

In one embodiment, the binder composition comprises a further component (iv) in form of one or more coupling agents, such as organofunctional silanes.

In one embodiment, component (iv) is selected from group consisting of organofunctional silanes, such as primary or secondary amino functionalized silanes, epoxy functionalized silanes, such as polymeric or oligomeric epoxy functionalized silanes, methacrylate functionalized silanes, alkyl and aryl functionalized silanes, urea funtionalised silanes or vinyl functionalized silanes.

In one embodiment, the binder composition further comprises a component (v) in form of one or more components selected from the group of bases, such as ammonia, such as alkali metal hydroxides, such as KOH, such as earth alkaline metal hydroxides, such as $Ca(OH)_2$, such as $Mg(OH)_2$, such as amines or any salts thereof.

In one embodiment, the binder composition further comprises a further component in form of urea, in particular in an amount of 5 to 40 wt.-%, such as 10 to 30 wt.-%, 15 to 25 wt.-%, based on the dry weight of component (i).

In one embodiment, the binder composition further comprises a further component in form of one or more carbohydrates selected from the group consisting of sucrose, reducing sugars, in particular dextrose, polycarbohydrates, and mixtures thereof, preferably dextrins and maltodextrins, more preferably glucose syrups, and more preferably glucose syrups with a dextrose equivalent value of DE=30 to less than 100, such as DE=60 to less than 100, such as DE=60-99, such as DE=85-99, such as DE=95-99.

In one embodiment, the binder composition further comprises a further component in form of one or more carbohydrates selected from the group consisting of sucrose and reducing sugars in an amount of 5 to 50 wt.-%, such as 5 to less than 50 wt.-%, such as 10 to 40 wt.-%, such as 15 to 30 wt.-% based on the dry weight of component (i).

In one embodiment, the mineral fibre product according to the present invention comprises mineral fibres in contact with the binder composition comprising a further component in form of one or more silicone resins.

In one embodiment, the binder composition according to the present invention comprises a further component (vi) in the form of one or more reactive or nonreactive silicones.

In one embodiment, the component (vi) is selected from the group consisting of silicone constituted of a main chain composed of organosiloxane residues, especially diphenylsiloxane residues, alkylsiloxane residues, preferably dimethylsiloxane residues, bearing at least one hydroxyl, carboxyl or anhydride, amine, epoxy or vinyl functional group capable of reacting with at least one of the constituents of the binder composition and is preferably present in an amount of 0.025-15 weight-%, preferably from 0.1-10 weight-%, more preferably 0.3-8 weight-%, based on the binder solids.

In one embodiment, the mineral fibre product according to the present invention comprises mineral fibres in contact with the binder composition comprising a further component in form of one or more mineral oils.

In the context of the present invention, a binder composition having a sugar content of 50 wt.-% or more, based on the total dry weight of the binder components, is considered to be a sugar based binder. In the context of the present invention, a binder composition having a sugar content of less than 50 wt.-%, based on the total dry weight of the binder components, is considered a non-sugar based binder.

In one embodiment, the binder composition further comprises a further component in form of one or more surface active agents that are in the form of non-ionic and/or ionic emulsifiers such as polyoxyethylenes (4) lauryl ether, such as soy lecithin, such as sodium dodecyl sulfate.

The use of lignin-based sulfonated products in binders may result in an increase in the hydrophilicity of some binders and final products, meaning one or more hydrophobic agents are to be added, such as one or more mineral oils, such as one or more silicone oil, such as one or more silicone resin.

In one embodiment, the aqueous binder composition consists essentially of

- a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins,
- a component (ii) in form of one or more cross-linkers;
- a component (iii) in form of one or more plasticizers;
- a component (iv) in form of one or more coupling agents, such as organofunctional silanes;
- optionally a component in form of one or more compounds selected from the group of bases, such as ammonia, such as alkali metal hydroxides, such as KOH, such as earth alkaline metal hydroxides, such as $Ca(OH)_2$, such as $Mg(OH)_2$, such as amines or any salts thereof;
- optionally a component in form of urea;
- optionally a component in form of a more reactive or nonreactive silicones;
- optionally a hydrocarbon oil;
- optionally one or more surface active agents;
- water, preferably with the proviso that the aqueous binder composition does not comprise a cross-linker selected from
- epoxy compounds having a molecular weight Mw of 500 or less and/or with the proviso that the aqueous binder composition does not comprise a cross-linker selected from
- carbonyl compounds selected from aldehydes, carbonyl compounds of the formula $R—[C(O)R_1]_x$
  in which:
  - R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10 and/or
  - with the proviso that the aqueous binder composition does not comprise a cross-linker selected from polyamines and/or
  - with the proviso that the aqueous binder composition does not comprise a cross-linker selected from mono- and oligosaccharides.

In one embodiment, the aqueous binder composition consists essentially of

- a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, and/or a component (ii) in form of one or more cross-linkers;

a component (iii) in form of one or more plasticizers;

a component (iv) in form of one or more coupling agents, such as organofunctional silanes;

optionally a component in form of one or more compounds selected from the group of bases, such as ammonia, such as alkali metal hydroxides, such as KOH, such as earth alkaline metal hydroxides, such as $Ca(OH)_2$, such as $Mg(OH)_2$, such as amines or any salts thereof;

optionally a component in form of urea;

optionally a component in form of a more reactive or nonreactive silicones;

optionally a hydrocarbon oil;

optionally one or more surface active agents;

water, preferably with the proviso that the aqueous binder composition does not comprise a cross-linker selected from epoxy compounds having a molecular weight Mw of 500 or less and/or with the proviso that the aqueous binder composition does not comprise a cross-linker selected from carbonyl compounds selected from aldehydes, carbonyl compounds of the formula R—$[C(O)R_1]_x$ in which:

R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10 and/or with the proviso that the aqueous binder composition does not comprise a cross-linker selected from polyamines and/or with the proviso that the aqueous binder composition does not comprise a cross-linker selected from mono- and oligosaccharides.

In one embodiment, the aqueous binder composition consists essentially of a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers;

a component (iv) in form of one or more coupling agents, such as organofunctional silanes;

optionally a component in form of one or more compounds selected from the group of bases, such as ammonia, such as alkali metal hydroxides, such as KOH, such as earth alkaline metal hydroxides, such as $Ca(OH)_2$, such as $Mg(OH)_2$, such as amines or any salts thereof;

optionally a component in form of urea;

optionally a component in form of a more reactive or nonreactive silicones;

optionally a hydrocarbon oil;

optionally one or more surface active agents;

water, preferably with the proviso that the aqueous binder composition does not comprise a cross-linker selected from epoxy compounds having a molecular weight MW of 500 or less and/or with the proviso that the aqueous binder composition does not comprise a cross-linker selected from carbonyl compounds selected from aldehydes, carbonyl compounds of the formula R—$[C(O)R_1]_x$ in which:

R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10 and/or with the proviso that the aqueous binder composition does not comprise a cross-linker selected from polyamines and/or with the proviso that the aqueous binder composition does not comprise a cross-linker selected from mono- and oligosaccharides.

In one embodiment, the aqueous binder composition consists essentially of a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, and/or a component (ii) in form of one or more cross-linkers;

a component (iv) in form of one or more coupling agents, such as organofunctional silanes;

optionally a component in form of one or more compounds selected from the group of bases, such as ammonia, such as alkali metal hydroxides, such as KOH, such as earth alkaline metal hydroxides, such as $Ca(OH)_2$, such as $Mg(OH)_2$, such as amines or any salts thereof;

optionally a component in form of urea;

optionally a component in form of a more reactive or nonreactive silicones;

optionally a hydrocarbon oil;

optionally one or more surface active agents;

water, preferably with the proviso that the aqueous binder composition does not comprise a cross-linker selected from epoxy compounds having a molecular weight MW of 500 or less and/or with the proviso that the aqueous binder composition does not comprise a cross-linker selected from carbonyl compounds selected from aldehydes, carbonyl compounds of the formula R—$[C(O)R_1]_x$ in which:

R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10 and/or with the proviso that the aqueous binder composition does not comprise a cross-linker selected from polyamines and/or with the proviso that the aqueous binder composition does not comprise a cross-linker selected from mono- and oligosaccharides.

The present inventors have surprisingly found that mineral fiber products comprising mineral fibers in contact with a binder resulting in the curing of an aqueous binder composition as it is described above have at a very high stability, both when freshly produced and after aging conditions.

Further, the present inventors have found that even higher product stability can be obtained by using a curing temperature of >230° C.

In one embodiment, the present invention is therefore directed to a mineral fiber product comprising mineral fibers in contact with a binder resulting from the curing of an aqueous binder composition as it is described above, where the curing temperature of >230° C. is used.

The present inventors have further found that the stability of the mineral fiber product can be further increased by the following measures:

- Lower line capacity, meaning longer curing time
- Addition of silicone resins
- Addition of high amounts of crosslinker
- Addition of a combination of two or more different crosslinkers
- Addition of small amounts of cationic species such as multivalent metal ions such as calcium and/or organic cationic species such as amines and/or organically modified inorganic compounds such as amine modified montmorillonite clays A Method for Producing a Mineral Fibre Product The present invention also provides a method for producing a mineral fibre product by binding mineral fibres with the binder composition.

Accordingly, the present invention is also directed to a method for producing a mineral fibre product which comprises the steps of contacting mineral fibres with a binder composition comprising a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins;

a component (ii) in form of one or more cross-linkers;

optionally a component (iii) in form of one or more plasticizers, preferably with the proviso that the aqueous binder composition does not comprise a cross-linker selected from epoxy compounds having a molecular weight Mw of 500 or less and/or with the proviso that the aqueous binder composition does not comprise a cross-linker selected from carbonyl compounds selected from aldehydes, carbonyl compounds of the formula $R-[C(O)R_1]_x$ in which:

R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10 and/or with the proviso that the aqueous binder composition does not comprise a cross-linker selected from polyamines and/or with the proviso that the aqueous binder composition does not comprise a cross-linker selected from mono- and oligosaccharides.

Curing

The web is cured by a chemical and/or physical reaction of the binder components. In one embodiment, the curing takes place in a curing device.

In one embodiment, the curing is carried out at temperatures from 100 to 300° C., such as 170 to 270° C., such as 180 to 250° C., such as 190 to 230° C.

In one embodiment, the curing takes place in a conventional curing oven for mineral wool production operating at a temperature of from 150 to 300° C., such as 170 to 270° C., such as 180 to 250° C., such as 190 to 230° C.

In one embodiment, the curing takes place for a time of 30 seconds to 20 minutes, such as 1 to 15 minutes, such as 2 to 10 minutes.

In a typical embodiment, curing takes place at a temperature of 150 to 250° C. for a time of 30 seconds to 20 minutes.

The curing process may commence immediately after application of the binder to the fibres. The curing is defined as a process whereby the binder composition undergoes a physical and/or chemical reaction which in case of a chemical reaction usually increases the molecular weight of the compounds in the binder composition and thereby increases the viscosity of the binder composition, usually until the binder composition reaches a solid state.

Mineral Fibre Product

The present invention is directed to a mineral fibre product comprising mineral fibres in contact with a cured binder composition resulting from the curing of the aqueous binder composition.

The mineral fibres employed may be any of man-made vitreous fibres (MMVF), glass fibres, ceramic fibres, basalt fibres, slag fibres, rock fibres, stone fibres and others. These fibres may be present as a wool product, e.g. like a stone wool product.

Fibre/melt composition

The man-made vitreous fibres (MMVF) can have any suitable oxide composition. The fibres can be glass fibres, ceramic fibres, basalt fibres, slag fibres or rock or stone fibres. The fibres are preferably of the types generally known as rock, stone or slag fibres, most preferably stone fibres.

Stone fibres commonly comprise the following oxides, in percent by weight:

$SiO_2$: 30 to 51
$Al_2O_3$: 12 to 30
CaO: 8 to 30
MgO: 2 to 25
FeO (including $Fe_2O_3$): 2 to 15
$Na_2O+K_2O$: not more than 10
CaO+MgO: 10 to 30

In preferred embodiments the MMVF have the following levels of elements, calculated as oxides in wt %:

$SiO_2$: at least 30, 32, 35 or 37; not more than 51, 48, 45 or 43

$Al_2O_3$: at least 12, 16 or 17; not more than 30, 27 or 25
CaO: at least 8 or 10; not more than 30, 25 or 20
MgO: at least 2 or 5; not more than 25, 20 or 15
FeO (including $Fe_2O_3$): at least 4 or 5; not more than 15, 12 or 10
FeO+MgO: at least 10, 12 or 15; not more than 30, 25 or 20
Na2O+$K_2O$: zero or at least 1; not more than 10
CaO+MgO: at least 10 or 15; not more than 30 or 25
$TiO_2$: zero or at least 1; not more than 6, 4 or 2
$TiO_2$+FeO: at least 4 or 6; not more than 18 or 12
B203: zero or at least 1; not more than 5 or 3
P205: zero or at least 1; not more than 8 or 5
Others: zero or at least 1; not more than 8 or 5

The MMVF made by the method of the invention preferably have the composition in wt.-%:

| | |
|---|---|
| $SiO_2$ | 35 to 50 |
| $Al_2O_3$ | 12 to 30 |
| $TiO_2$ | up to 2 |
| $Fe_2O_3$ | 3 to 12 |
| CaO | 5 to 30 |
| MgO | up to 15 |
| $Na_2O$ | 0 to 15 |
| $K_2O$ | 0 to 15 |
| $P_2O_5$ | up to 3 |
| MnO | up to 3 |
| $B_2O_3$ | up to 3 |

Another preferred composition for the MMVF is as follows in wt %:

| | |
|---|---|
| $SiO_2$ | 39-55% preferably 39-52% |
| $Al_2O_3$ | 16-27% preferably 16-26% |
| CaO | 6-20% preferably 8-18% |
| MgO | 1-5% preferably 1-4.9% |
| $Na_2O$ | 0-15% preferably 2-12% |
| $K_2O$ | 0-15% preferably 2-12% |
| $R_2O$ ($Na_2O$ + $K_2O$) | 10-14.7% preferably 10-13.5% |
| $P_2O_5$ | 0-3% preferably 0-2% |
| $Fe_2O_3$ (iron total) | 3-15% preferably 3.2-8% |
| $B_2O_3$ | 0-2% preferably 0-1% |
| $TiO_2$ | 0-2% preferably 0.4-1% |
| Others | 0-2.0% |

Glass fibres commonly comprise the following oxides, in percent by weight:

$SiO_2$: 50 to 70
$Al_2O_3$: 10 to 30
CaO: not more than 27
MgO: not more than 12

Glass fibres can also contain the following oxides, in percent by weight: $Na_2O$+$K_2O$: 8 to 18, in particular $Na_2O$+$K_2O$ greater than CaO+MgO $B_2O_3$: 3 to 12

Some glass fibre compositions can contain $Al_2O_3$: less than 2%.

Suitable fibre formation methods and subsequent production steps for manufacturing the mineral fibre product are those conventional in the art. Generally, the binder is sprayed immediately after fibrillation of the mineral melt on to the air-borne mineral fibres. The aqueous binder composition is normally applied in an amount of 0.1 to 18%, preferably 0.2 to 8% by weight, of the bonded mineral fibre product on a dry basis.

The spray-coated mineral fibre web is generally cured in a curing oven by means of a hot air stream. The hot air stream may be introduced into the mineral fibre web from below, or above or from alternating directions in distinctive zones in the length direction of the curing oven.

Typically, the curing oven is operated at a temperature of from about 100° C. to about 300° C., such as 170 to 270° C., such as 180 to 250° C., such as 190 to 230° C. Generally, the curing oven residence time is from 30 seconds to 20 minutes, such as 1 to 15 minutes, such as 2 to 10 minutes, depending on, for instance, the product density.

In a typical embodiment, the mineral fibre product according to the present invention is cured at a temperature of 150° C. to 250° C. for a time of 30 seconds to 20 minutes.

If desired, the mineral wool web may be subjected to a shaping process before curing. The bonded mineral fibre product emerging from the curing oven may be cut to a desired format e.g., in the form of a batt. Thus, the mineral fibre products produced, for instance, have the form of woven and nonwoven fabrics, mats, batts, slabs, sheets, plates, strips, rolls, granulates and other shaped articles which find use, for example, as thermal or acoustical insulation materials, vibration damping, construction materials, facade insulation, reinforcing materials for roofing or flooring applications, as filter stock and in other applications.

In accordance with the present invention, it is also possible to produce composite materials by combining the bonded mineral fibre product with suitable composite layers or laminate layers such as, e.g., metal, glass surfacing mats and other woven or non-woven materials.

The mineral fibre products according to the present invention generally have a density within the range of from 6 to 250 kg/m 3, preferably 20 to 200 kg/m 3. The mineral fibre products generally have a loss on ignition (LOI) within the range of 0.3 to 18.0%, preferably 0.5 to 8.0%.

Use of a Lignin Component for the Preparation of a Binder Composition

The present invention is also directed to the use of a lignin component in form of one or more lignosulfonate lignins having the features as described above for component (i) for the preparation of a binder composition for mineral wool.

In one embodiment, the binder composition is free of phenol and formaldehyde.

In one embodiment, the present invention is directed to the use of a lignin component in the form of one or more lignosulfonate lignins having the features of component (i) described above for the preparation of a binder composition, preferably free of phenol and formaldehyde, for mineral wool, whereby this binder composition further comprises components (ii) and optionally (iii) as defined above, preferably with the proviso that the aqueous binder composition does not comprise a cross-linker selected from epoxy compounds having a molecular weight Mw of 500 or less and/or with the proviso that the aqueous binder composition does not comprise a cross-linker selected from carbonyl compounds selected from aldehydes, carbonyl compounds of the formula R—$[C(O)R_1]_x$ in which:

R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10 and/or with the proviso that the aqueous binder composition does not comprise a cross-linker selected from polyamines and/or with the proviso that the aqueous binder composition does not comprise a cross-linker selected from mono- and oligosaccharides.

In one embodiment, the present invention is directed to the use of a lignin component in form of one or more lignosulfonate lignins having the features of component (i) described above for the preparation of a binder composition, preferably free of phenol and formaldehyde, whereby the binder composition further comprises component (iia) as defined above.

BRIEF DESCRIPTION OF THE DRAWING

In the drawing,

FIG. 1 shows the chemical structure of a lignosulfonate lignin for use as component (i) of a binder composition used according to the invention.

EXAMPLES

In the following examples, several binders which fall under the definition of the present invention were prepared and compared to binders according to the prior art.

The following properties were determined for the binders according to the present invention and the binders according to the prior art, respectively:

Binder Component Solids Content

The content of each of the components in a given binder solution before curing is based on the anhydrous mass of the components.

Lignosulfonates were supplied by Borregaard, Norway and LignoTech, Florida as liquids with approximately 50% solid content. Primid XL552 was supplied by EMS-CHEMIE AG, Silane (Momentive VS-142 40% activity), was supplied by Momentive and was calculated as 100% for simplicity. $NH_4OH$ 24.7% was supplied by Univar and used in supplied form. PEG 200, urea, KOH pellets, 1,1,1 tris (hydroxyl-methyl)propane were supplied by Sigma-Aldrich and were assumed anhydrous for simplicity.

Binder Solids

The content of binder after curing is termed “binder solids”.

Disc-shaped stone wool samples (diameter: 5 cm; height 1 cm) were cut out of stone wool and heat-treated at 580° C. for at least 30 minutes to remove all organics. The solids of the binder mixture was measured by distributing a sample of the binder mixture (approx. 2 g) onto a heat treated stone wool disc in a tin foil container. The weight of the tin foil container containing the stone wool disc was weighed before and directly after addition of the binder mixture. Two such binder mixture loaded stone wool discs in tin foil containers were produced and they were then heated at 200° C. for 1 hour. After cooling and storing at room temperature for 10 minutes, the samples were weighed and the binder solids was calculated as an average of the two results.

A binder with a desired binder solids could then be produced by diluting with the required amount of water and 10% aq. silane (Momentive VS-142).

Mechanical Strength Studies

Bar Tests

The mechanical strength of the binders was tested in a bar test. For each binder, 16 bars were manufactured from a mixture of the binder and stone wool shots from the stone wool spinning production.

A sample of this binder solution having 15% dry solid matter (16.0 g) was mixed well with shots (80.0 g). The resulting mixture was then filled into four slots in a heat resistant silicone form for making small bars (4×5 slots per form; slot top dimension: length=5.6 cm, width=2.5 cm; slot bottom dimension: length=5.3 cm, width=2.2 cm; slot height=1.1 cm). The mixtures placed in the slots were then pressed with a suitably sized flat metal bar to generate even bar surfaces. 16 bars from each binder were made in this fashion. The resulting bars were then cured typically at 225° C. The curing time was 1 h. After cooling to room temperature, the bars were carefully taken out of the containers. Five of the bars were aged in a water bath at 80° C. for 3 h. This method of curing the prepared bars was used for the examples in Table 1.

After drying for 3 days, the aged bars as well as five unaged bars were broken in a 3 point bending test (test speed: 10.0 mm/min; rupture level: 50%; nominal strength: 30 N/mm 2; support distance: 40 mm; max deflection 20 mm; nominal e-module 10000 N/mm 2) on a Bent Tram machine to investigate their mechanical strengths. The bars were placed with the “top face” up (i.e. the face with the dimensions length=5.6 cm, width=2.5 cm) in the machine.

Binder Example, Reference Binder (Phenol-Formaldehyde Resin Modified with Urea, a PUF-Resol)

This binder is a phenol-formaldehyde resin modified with urea, a PUF-resol.

A phenol-formaldehyde resin is prepared by reacting 37% aq. formaldehyde (606 g) and phenol (189 g) in the presence of 46% aq. potassium hydroxide (25.5 g) at a reaction temperature of 84° C. preceded by a heating rate of approximately 1° C. per minute. The reaction is continued at 84° C. until the acid tolerance of the resin is 4 and most of the phenol is converted. Urea (241 g) is then added and the mixture is cooled.

The acid tolerance (AT) expresses the number of times a given volume of a binder can be diluted with acid without the mixture becoming cloudy (the binder precipitates). Sulfuric acid is used to determine the stop criterion in a binder production and an acid tolerance lower than 4 indicates the end of the binder reaction.

To measure the AT, a titrant is produced from diluting 2.5 ml conc. sulfuric acid (>99%) with 1 L ion exchanged water. 5 mL of the binder to be investigated is then titrated at room temperature with this titrant while keeping the binder in motion by manually shaking it; if preferred, use a magnetic stirrer and a magnetic stick. Titration is continued until a slight cloud appears in the binder, which does not disappear when the binder is shaken.

The acid tolerance (AT) is calculated by dividing the amount of acid used for the titration (mL) with the amount of sample (mL):

$$AT=(\text{Used titration volume (mL)})/(\text{Sample volume (mL)})$$

Using the urea-modified phenol-formaldehyde resin obtained, a binder is made by addition of 25% aq. ammonia (90 mL) and ammonium sulfate (13.2 g) followed by water (1.30 kg).

The binder solids were then measured as described above and the mixture was diluted with the required amount of water and silane for mechanical measurements (15% binder solids solution, 0.5% silane of binder solids).

Examples 1-7

In the following, the entry numbers of the binder example correspond to the entry numbers used in Table 1.

The carboxylic acid group content of all lignosulfonates used for the binders according to the present invention was measured using 31P NMR and was found to be in the range of 0.05 to 0.6 mmol/g, based on the dry weight of the lignosulfonate lignins, while it was found for this specific batch used for examples 1, 2, 3, 4, 5, 6, 7 to be 0.14 mmol/g.

Example 1

To 30.0 g lignosulfonate solution (50% solids), 0.4 g $NH_4OH$ (24.7%) was added and mixed followed by addition of 0.7 g Silane (Momentive VS-142 40% activity, 10% in water) and 68.9 g water were added and mixed to yield 15% solids and then used for test of mechanical properties in bar tests.

Example 3

To 30.0 g lignosulfonate solution (50% solids), 0.4 g $NH_4OH$ (24.7%) was added and mixed followed by addition of 6.0 g Primid XL552 (100% solids) and mixing. Finally, 1.0 g Silane (Momentive VS-142 40% activity, 10% in water) and 102.6 g water were added and mixed to yield 15% solids and then used for test of mechanical properties in bar tests.

Mechanical properties are presented in Table 1. For simplicity, quantities of all other components are recalculated based on 100 g of dry lignin.

As can be seen from Table 1, in a combination of lignosulfonate and crosslinker (Primid XL 552) higher amounts of crosslinker lead to better mechanical properties.

TABLE 1

| Binder composition | PUF ref | 1 | 2 | 3 | 4 |
|---|---|---|---|---|---|
| ammonium lignosulfonate (g solids) | | 100 | 100 | 100 | 100 |
| urea (g) | | | | | |
| ammonia, 24.7% (g) | | 2.5 | 2.5 | 2.5 | 2.5 |
| Primid XL552 (g) | | 0 | 25 | 40 | 60 |
| Momentive VS 142 (% of binder solids), based on 40% activity | | 0.5 | 0.5 | 0.5 | 0.5 |
| Binder properties | | | | | |
| Mechanical strength, unaged (N), bar tests | 350 | 60 | 280 | 460 | 640 |
| Mechanical strength, aged (N), bar tests | 150 | 0 | 160 | 180 | 230 |
| Curing temp, ° C. | 200 | 225 | 225 | 225 | 225 |

Examples 5-7: Test of stone wool products

The low density products have been examined for properties according to the product standard for Factory made mineral wool (MW) products, DS/EN13162:2012+A1:2015, meaning relevant mechanical properties besides other basic characteristics for stone wool products.

The testing has been performed on slabs, where test specimens according to the dimensional specifications and to the number of test specimens required to get one test result, as stated in EN13162 for each of the different test methods, has been cut out. Each of the stated values for the mechanical properties obtained is an average of more results according to EN13162.

Tests are performed on products or test specimens sampled directly from the production line before packing (line cuts) and/or for products or test specimens sampled from packs 24 hours after packing (24 h packs).

Dimensions

Dimensions of products and test specimens has been performed according to the relevant test methods, DS/EN822:2013: Thermal insulating products for building applications—Determination of length and width, and DS/EN823:2013: Thermal insulating products for building applications—Determination of thickness.

Binder Content (Loss on Ignition)

Determination of binder content is performed according to DS/EN13820:2003: Thermal insulating materials for building applications—Determination of organic content, where the binder content is defined as the quantity of organic material burnt away at a given temperature, stated in the standard to be (500±20° C.). In the testing the temperature (590±20° C., for at least 10 min or more until constant mass) has been used in order to make sure that all organic material is burnt away. Determination of ignition loss consists of at least 10 g wool corresponding to 8-20 cut-outs (minimum 8 cut-outs) performed evenly distributed over the test specimen using a cork borer ensuring to comprise an entire product thickness. The binder content is taken as the LOI. The binder includes oil and other binder additives.

Tensile Strength

The tensile strength of low density products has been determined according to EN 1608:2013: Thermal insulating products for building applications—Determination of tensile strength parallel to faces. The tensile strength is measured on test specimens from line cuts and on test specimens from 24 h packs.

Self Deflection (f70)

Self-deflection is measured according to an internal test method for determining the deflection caused by the net weight of a product. A test-specimen of length: 990±10 mm and width: min. 270±5 mm and max 680±5 mm is placed horizontally on two supports (tilting table) with a mutual centre distance of (700±2) mm and two moveable supporting devices. The self-deflection is measured in the middle of the specimen and recorded either mechanically or electrically (transducer with display) and read either on a scale or a digital display. If the original product is longer than 990±10 mm the extra length is cut off. The self-deflection is measured on both surfaces of the test specimen. The accuracy of measurement is ±0.2 mm for self-deflection <10 mm and ±1 mm for self-deflection >10 mm).

The self-deflection is reported as (f70, 70 cm span)=(f1+f2)/2 mm, where f1 is the measurement with surface 1 facing up and f2 is the measurement with surface 2 facing up.

Testing is performed on test specimens from line cuts and on test specimens from 24 h packs.

Example 5

The stone wool product has been produced by use of binder in example 5, at a curing oven temperature set to 275° C.

730.0 kg of ammonium lignosulfonate was placed in a mixing vessel to which 8.5 l $NH_4OH$ (24.7%) was added and stirred. Afterwards, 151 kg Primid XL552 solution (premade 31 wt % solution in water) and 43 kg PEG 200 (100% solids) were added and mixed followed by addition of 13 kg Silane (Momentive VS-142 40% activity, 10% in water) and 100 kg silicone (Wacker BS 1052, 12% in water).

The binder from this example is used to produce a low density stone wool product, thickness and density were measured as indicated in Table 2. Curing oven temperature was set to 275° C.

Example 6

The stone wool product has been produced by use of binder in example 6, at a curing oven temperature set to 275° C.

730.0 kg of ammonium lignosulfonate was placed in a mixing vessel to which 8.5 l NH 4 OH (24.7%) was added and stirred. Afterwards, 151 kg Primid XL552 solution (pre-made 31 wt % solution in water) and 43 kg PEG 200 (100% solids) were added and mixed followed by addition of 13 kg Silane (Momentive VS-142 40% activity, 10% in water) and 100 kg silicone (Wacker BS 1052, 12% in water).

The binder from this example is used to produce a low density stone wool product, thickness and density were measured as indicated in Table 2. Curing oven temperature was set to 275° C.

Example 7

The stone wool product has been produced by use of binder in example 53, at a curing oven temperature set to 275° C.

609.0 kg of ammonium lignosulfonate was placed in a mixing vessel to which 8 l NH 4 OH (24.7%) was added and stirred. Afterwards, 384 kg Primid XL552 solution (pre-made 31 wt % solution in water) was added and mixed followed by addition of 14 kg Silane (Momentive VS-142 40% activity, 10% in water).

The binder from this example is used to produce a low density stone wool product, thickness and density were measured as indicated in Table 2. Curing oven temperature was set to 275° C.

TABLE 2

| | Tensile strength, crosswise - packs | | | | | Tensile strength, crosswise - line cuts | | | |
|---|---|---|---|---|---|---|---|---|---|
| Example | Thickness mm | Ignition loss % | Self deflection f(70) mm | Sample density kg/m3 | Sigma (t) kPa | Ignition loss % | Thickness mm | Sample density kg/m3 | Sigma (t) kPa |
| PUF-reference | 145 | 2.82 | 7.2 | 32.3 | 7.6 | 2.50 | 153 | 31.0 | 10.2 |
| 5 | 137 | 3.10 | 15.8 | 34.3 | 5.9 | 2.61 | 157 | 29.4 | 10.2 |
| 6 | 137 | 3.92 | 9.6 | 32.9 | 5.6 | 3.57 | 157 | 32.2 | 9.3 |
| 7 | 139 | 2.81 | 8.9 | 34.3 | 6.7 | 2.54 | 158 | 30.7 | 8.7 |

The invention claimed is:

1. A mineral fiber product, wherein the product comprises mineral fibers in contact with a binder resulting from a curing of an aqueous binder composition which is free of phenol and formaldehyde and comprises:

a component (i) in the form of one or more lignosulfonate lignins having a carboxylic acid group content of from 0.03 mmol/g to 1.4 mmol/g and a content of phenolic OH groups of from 0.3 mmol/g to 2.5 mmol/g, both based on a dry weight of lignosulfonate lignins, a component (ii) in the form of one or more cross-linkers, with the proviso that the aqueous binder composition does not comprise a cross-linker selected from epoxy compounds having a molecular weight MW of 500 or less;

carbonyl compounds selected from aldehydes, carbonyl compounds of the formula R—[C(O)$R_1$]x in which:

R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10, and polyamines.

2. The mineral fiber product of claim 1, wherein component (i) has a carboxylic acid group content of from 0.05 mmol/g to 0.6 mmol/g, based on a dry weight of lignosulfonate lignins.

3. The mineral fiber product of claim 1, wherein component (i) is present in the form of one or more lignosulfonate lignins having an average carboxylic acid group content of less than 1.8 groups per macromolecule, considering a $M_n$ wt. average of component (i).

4. The mineral fiber product of claim 1, wherein component (i) has a content of aliphatic OH groups of from 1.0 mmol/g to 8.0 mmol/g, based on a dry weight of lignosulfonate lignins.

5. The mineral fiber product of claim 1, wherein component (i) comprises one or more of ammonium lignosulfonates, calcium lignosulfonates, or magnesium lignosulfonates.

6. The mineral fiber product of claim 1, wherein component (i) comprises ammonium lignosulfonates and calcium lignosulfonates, a molar ratio of $NH_4^+$ to $Ca_2^+$ ranging from 5:1 to 1:5.

7. The mineral fiber product of claim 1, wherein the aqueous binder composition comprises added sugar in an amount of up to less than 5 wt.-%, based on a weight of lignosulfonate and sugar.

8. The mineral fiber product of claim 1, wherein the aqueous binder composition comprises component (i) in a concentration of from 50 wt.-% to 98 wt.-%, based on a dry weight of components (i) and (ii).

9. The mineral fiber product of claim 1, wherein component (ii) is in the form of one or more cross-linkers selected from one or more of β-hydroxyalkylamide-cross-linkers, multifunctional organic amines, epoxy compounds having a molecular weight of more than 500, and multifunctional carbodiimides.

10. The mineral fiber product of claim 1, wherein component (ii) comprises one or more cross-linkers selected from β-hydroxyalkylamide cross-linkers.

11. The mineral fiber product of claim 1, wherein component (ii) is present in a concentration of from 2 wt.-% to 90 wt.-%, based on a dry weight of component (i).

12. The mineral fiber product of claim 1, wherein a component (iii) in the form of one or more coupling agents is further present.

13. The mineral fiber product of claim 1, wherein a component (iv) in the form of one or more components selected from bases is further present.

14. The mineral fiber product of claim 1, wherein urea is further present.

15. The mineral fiber product of claim 1, wherein a component (v) in the form of one or more reactive or nonreactive silicones is further present.

16. The mineral fiber product of claim 1, wherein the product does not contain an ammonia-oxidized lignin (AOL).

17. The mineral fiber product of claim 1, wherein the aqueous binder composition consists essentially of a component (i) in the form of lignosulfonate lignins having a carboxylic acid group content of from 0.03 mmol/g to 2.0 mmol/g and a content of phenolic OH groups of from 0.3 mmol/g to 2.5 mmol/g, based on the dry weight of the lignosulfonate lignins, a component (ii) in the form of one or more cross-linkers, a component (iii) in the form of one or more coupling agents, optionally, a component in the form of one or more compounds selected from bases, optionally, urea, optionally, a component in the form of one more more reactive or non-reactive silicones, optionally, a hydrocarbon oil, optionally, one or more surface active agents, and water.

18. The mineral fiber product of claim 1, wherein the aqueous binder composition does not comprise a plasticizer.

* * * * *